United States Patent
Mu et al.

(10) Patent No.: US 12,492,844 B2
(45) Date of Patent: Dec. 9, 2025

(54) MOLTEN SALT ENERGY STORAGE (MSES) ELECTRIC HEATING SYSTEM

(71) Applicant: Beijing Minli Energy Storage Technology Co., Ltd., Beijing (CN)

(72) Inventors: Shihui Mu, Beijing (CN); Shuguang Zhao, Beijing (CN); Duanyang Zheng, Beijing (CN)

(73) Assignee: Beijing Minli Energy Storage Technology Co., Ltd., Beijing (CN)

( * ) Notice: Subject to any disclaimer, the term of this patent is extended or adjusted under 35 U.S.C. 154(b) by 0 days.

(21) Appl. No.: 19/223,126

(22) Filed: May 30, 2025

(65) Prior Publication Data

US 2025/0369650 A1    Dec. 4, 2025

(30) Foreign Application Priority Data

Jun. 3, 2024  (CN) .......................... 202410704537.X

(51) Int. Cl.
| | | |
|---|---|---|
| *F24H 15/156* | (2022.01) | |
| *F24H 7/02* | (2022.01) | |
| *F24H 15/144* | (2022.01) | |
| *F24H 15/172* | (2022.01) | |
| *F28D 20/00* | (2006.01) | |

(52) U.S. Cl.
CPC ......... *F24H 15/156* (2022.01); *F24H 7/0208* (2013.01); *F24H 15/144* (2022.01); *F24H 15/172* (2022.01); *F28D 2020/0047* (2013.01)

(58) Field of Classification Search
CPC .... F24H 15/156; F24H 15/172; F24H 15/144; F24H 7/0208; F28D 2020/0047
See application file for complete search history.

(56) References Cited

FOREIGN PATENT DOCUMENTS

| CN | 113432119 A | * | 9/2021 | ............... F23C 10/10 |
| CN | 116518763 A | * | 8/2023 | ......... F28D 20/0034 |

OTHER PUBLICATIONS

English translation of CN-113432119-A, dated Jul. 21, 2025 (Year: 2025).*
English translation of CN-116518763-A, dated Jul. 21, 2025 (Year: 2025).*

* cited by examiner

*Primary Examiner* — Edelmira Bosques
*Assistant Examiner* — Brett Peterson Mallon
(74) *Attorney, Agent, or Firm* — Bayramoglu Law Offices LLC

(57) ABSTRACT

Provided is a molten salt energy storage (MSES) electric heating system, including: an effect module configured to analyze a heat storage effect of each of different molten salt (MS) components; a cost module configured to analyze a cost consumption of each of the different MS components; an environmental protection module configured to analyze an environmental protection condition of each of the different MS components; a proportion module configured to determine a proportion of each of the different MS components; a demand module configured to calculate an actual demand; and a scheduling module configured to schedule stored heat. This system improves the efficiency of MSES.

9 Claims, 10 Drawing Sheets

MOLTEN SALT ENERGY STORAGE (MSES) ELECTRIC HEATING SYSTEM

CROSS REFERENCE TO THE RELATED APPLICATIONS

This application is based upon and claims priority to Chinese Patent Application No. 202410704537.X, filed on Jun. 3, 2024, the entire contents of which are incorporated herein by reference.

TECHNICAL FIELD

The present disclosure relates to the technical field of molten salt energy storage (MSES), and in particular to an MSES electric heating system.

BACKGROUND

MSES electric heating is a sensible heat storage technology that utilizes molten salts (MSs) as a heat transfer medium. The MSs are liquid mixtures formed by melting certain salts at high temperatures, such as halides, nitrates and sulfates of alkali metals and alkaline earth metals. Such a substance serves as the outstanding heat transfer and storage medium for its high boiling point, low viscosity, low steam pressure and high volumetric heat capacity. The MSES has advantages of the low saturated vapor pressure, good high-temperature stability, low viscosity and high specific heat capacity, making it suitable for large-scale and long-duration medium and high temperature heat storage. In addition to solar thermal power generation, the MSES system is further applicable to various fields such as flexibility retrofitting of thermal plants, waste heat recovery, and clean heating. It is one of key technologies to construct future new energy storage systems.

In the related art, due to a single use mode of the MSES in different scenarios, performance of the MSES in some scenario is undesirable. Moreover, the efficiency of the MSES is also low. Therefore, there is room for improvement.

SUMMARY

An objective of the present disclosure is to provide an MSES electric heating system, to solve the problem in the background.

The present disclosure provides an MSES electric heating system, including:

an effect module, configured to acquire a geographical environment of MSES, analyze a heat storage effect of each of different MS components according to the geographical environment of the MSES, and label the heat storage effect as a component effect $AX_m$, m being a serial number of each of the different MS components;

a cost module, configured to analyze a cost consumption of each of the different MS components according to the geographical environment of the MSES, and label the cost consumption as $AC_m$, m being the serial number of each of the different MS components;

an environmental protection module, configured to analyze an environmental protection condition of each of the different MS components according to the geographical environment of the MSES, and label the environmental protection condition as $AH_m$, m being the serial number of each of the different MS components;

a proportion module in signal connection with the effect module, the cost module and the environmental protection module, configured to receive the component effect $AX_m$, the cost consumption $AC_m$ and the environmental protection condition $AH_m$, calculate suitability of each of the different MS components, determine a proportion of each of the different MS components according to the suitability of each of the different MS components, and label the proportion as an MS component proportion;

a demand module in signal connection with the proportion module, configured to receive the MS component proportion, acquire an actual heating demand, and calculate an actual demand condition; and a scheduling module in signal connection with the demand module, configured to receive the demand condition, and schedule stored heat according to the demand condition.

With the above technical solution, in response to different use scenarios, the present disclosure analyzes the effects, costs and environmental protection conditions of different MS components according to the actual geographical environment, and provides more suitable MS components according to an actual heating demand, improving the efficiency of the MSES electric heating system.

Preferably, the effect module is configured to acquire the geographical environment of the MSES, analyze the heat storage effect of each of different MS components according to the geographical environment of the MSES, and label the heat storage effect as the component effect $AX_m$, m being the serial number of each of the different MS components, and is specifically configured to:

acquire the geographical environment of the MSES, the geographical environment including an average temperature BW, an average humidity BS, and an average illumination BG;

acquire a suitable environment of each of the different MS components, the suitable environment including a suitable temperature $W_m$, a suitable humidity $S_m$, and a suitable illumination $G_m$, and m being the serial number of each of the different MS components;

acquire an initial heat storage effect $C_m$ of each of the different MS components, m being the serial number of each of the different MS components; and calculate the component effect $AX_m$ of each of the different MS components according to a heat storage effect correlation function $AX_m = C_m - b_1 \times |BW - W_m| - b_2 \times |BS - S_m| - b_3 \times |BG - G_m|$, m being the serial number of each of the different MS components, and $b_1$, $b_2$, and $b_3$ each being a scaling factor greater than 0.

With the above technical solution, the present disclosure analyzes the heat storage effects of the different MS components according to the temperature, humidity and illumination, and selects the MS components more suitable for the use scenario, improving the application effect of the MSES system, and improving the efficiency of the MSES electric heating system.

Preferably, the cost module is configured to analyze the cost consumption of each of the different MS components according to the geographical environment of the MSES, and label the cost consumption as $AC_m$, m being the serial number of each of the different MS components, and is specifically configured to:

acquire a cost $CC_m$ of each of the different MS components, m being the serial number of each of the different MS components;

based on the average temperature BW, establish a negative correlation curve between the average temperature and a stability of each of the different MS components, and analyze the negative correlation curve between the average temperature and the stability of each of the different MS components to obtain the stability $CW_m$ of each of the different MS components, m being the serial number of each of the different MS components;

acquire a thermophysical property $CR_m$ of each of the different MS components, m being the serial number of each of the different MS components; and calculate the cost consumption $AC_m$ of each of the different MS components according to a cost consumption correlation function $AC_m = CC_m - c_1 \times CW_m - c_2 \times CR_m$, m being the serial number of each of the different MS components, and $c_1$ and $c_2$ each being a scaling factor greater than 0.

With the above technical solution, according to the costs, temperature affected component stability and thermophysical properties of the different MS components, the present disclosure analyzes the cost and consumption of the MS component, selecting the lower-cost MS components, and lowering the cost of the MSES electric heating system.

Preferably, the proportion module is configured to calculate the suitability of each of the different MS components, determine the proportion of each of the different MS components according to the suitability of each of the different MS components, and label the proportion as the MS component proportion, and is specifically configured to:

calculate the suitability $AS_m$ of each of the different MS components according to a suitability correlation function $AS_m = d_1 \times AX_m - d_2 \times AC_m + d_3 \times AH_m$, m being the serial number of each of the different MS components, and $d_1$, $d_2$, and $d_3$ each being a scaling factor greater than 0;

form a weight percentage according to the suitability $AS_m$ of each of the different MS components, and label the weight percentage as a primary proportion;

acquire a service environment of the MSES based on the primary proportion, and analyze the service environment of the MSES to obtain a heat storage capacity; and acquire a historical heating demand based on the heat storage capacity, and adjust the weight percentage according to the historical heating demand, to obtain the MS component proportion.

With the above technical solution, through comprehensive consideration on the heat storage effect, cost consumption and environmental protection condition of the MS component, the present disclosure analyzes the suitability of the MS component, provides the MS component proportion, and adjusts the proportion according to the actual heating demand, thereby providing the more suitable MS component, and improving the efficiency of the MSES electric heating system.

Preferably, the step of acquiring a service environment of the MSES based on the primary proportion, and analyzing the service environment of the MSES to obtain a heat storage capacity specifically includes:

acquiring the service environment of the MSES, the service environment including a pressure EY, a pH value EP, a water storage capacity EZ, and a chemical reaction condition EH;

acquiring a standard service environment of each of the different MS components, the standard service environment including a standard pressure $Y_m$, a standard pH value $P_m$, and water consumption $Z_m$;

acquiring a total MS amount of the MSES, and calculating an initial heat storage capacity $E_0$ of an MS according to the primary proportion; and calculating the heat storage capacity EC according to a heat storage capacity correlation function $EC = E_0 - e_1 \times |EY - Y_m| - e_2 \times |EP - P_m| - e_3 \times |EZ - Z_m| - EH$, $e_1$, $e_2$, and $e_3$ each being a scaling factor greater than 0.

With the above technical solution, the present disclosure calculates the heat storage capacity of the MS component at the primary proportion according to the actual pressure, pH value, water consumption and chemical reaction condition of the MSES system, and makes the calculated heat storage capacity more accurate according to the actual use, improving the accuracy of the MSES electric heating system.

Preferably, the step of acquiring the chemical reaction condition EH specifically includes:

based on the primary proportion, selecting the different MS components that react with each other to form different reactive combinations;

based on the different reactive combinations, acquiring a reaction intensity $Z_n$ of each of the different reactive combinations, n being a serial number of each of the different reactive combinations;

based on the total MS amount of the MSES and the primary proportion, obtaining a reaction range $F_n$ of each of the different reactive combinations according to an amount of each of the different reactive combinations, n being the serial number of each of the different reactive combinations; and calculating the chemical reaction condition EH according to a reaction correlation function $$EH = \sum_{i=0}^{n} Z_i \times F_i,$$

n being the serial number of each of the different reactive combinations.

With the above technical solution, the present disclosure comprehensively analyzes reaction conditions of the different chemically reactive combinations according to reaction intensities of the different chemically reactive combinations of the MS components and according to the reaction range of the reaction amount, and adds reaction conditions of all chemically reactive combinations to obtain a total chemical reaction condition, improving the reliability of the MSES electric heating system.

Preferably, the step of acquiring a historical heating demand based on the heat storage capacity, and adjusting the weight percentage according to the historical heating demand, to obtain the MS component proportion specifically includes:

acquiring the historical heating demand based on the heat storage capacity, calculating a difference between the heat storage capacity and the historical heating demand, and labeling the difference as a first demand difference;

setting a demand difference threshold based on the first demand difference, and if the first demand difference is not greater than 0, comparing the first demand difference with the demand difference threshold;

if the first demand difference is greater than the demand difference threshold, setting the primary proportion as the MS component proportion;

if the first demand difference is not greater than the demand difference threshold, sorting the different MS components according to the component effect $AX_m$ from high to low, and labeling as sorted data;

setting an adjustment proportion based on the sorted data, increasing the different MS components with a highest component effect according to the adjustment proportion, and decreasing the different MS components with a lowest component effect according to the adjustment proportion, thereby forming an intermediate proportion;

calculating a heat storage capacity of the MSES based on the intermediate proportion, calculating a second demand difference according to the historical heating demand, and comparing whether the second demand difference is greater than the demand difference threshold;

if the second demand difference is greater than the demand difference threshold, setting the intermediate proportion as the MS component proportion; and if the second demand difference is not greater than the demand difference threshold, performing readjustment according to another adjustment proportion to form a new proportion.

With the above technical solution, according to the heating demand, the present disclosure analyzes whether the proportion of the MS component can meet the heating demand. If the heating demand cannot be met, the present disclosure adjusts the proportion repeatedly and gradually until meeting the heating demand, and sets the MS component according to the proportion, improving the efficiency of the MSES electric heating system.

Preferably, the demand module is configured to acquiring the actual heating demand, and calculate an actual demand condition, and is specifically configured to:

acquire a real-time heating demand NG and a temperature variation condition;

acquire a negative correlation curve between a historical temperature and the historical heating demand based on the temperature variation condition, and perform prediction according to the negative correlation curve between the historical temperature and the historical heating demand to obtain a heating demand fluctuated value NB;

acquire a historical heating variation curve, and searching a maximum historical heating fluctuated value ND; and calculate the actual demand condition NQ according to a demand correlation function NQ=NG+ND+NQ.

With the above technical solution, according to the real-time heating demand, the heating demand fluctuation caused by temperature variation, and the maximum fluctuated value in the historical use record, the present disclosure comprehensively analyzes the actual demand condition for heating, reducing the phenomenon in which the heating does not meet the user demand, and improving the use experience of the MSES electric heating system.

Preferably, the scheduling module in signal connection with the demand module is configured to receive the demand condition, and schedule the stored heat according to the demand condition, and is specifically configured to:

acquire an actual heating supply based on the actual demand condition NQ, calculate a difference between the actual heating supply and the actual demand condition, and label the difference as an actual heating difference;

acquire a power supply condition in heating time based on the actual heating difference, and determine whether the power supply condition is in a peak period;

if the power supply condition is in the peak period, feed heat of the actual heating difference to a power grid through a heat conversion device for power generation; and if the power supply condition is not in the peak period, feed the heat of the actual heating difference to an energy storage battery through the heat conversion device for electricity storage and next electric heating.

With the above technical solution, the present disclosure converts excess heating supply into electricity through the heat conversion device, and feeds the electricity to the power grid for use or the energy storage battery for storage according to generation time of the electricity, reducing the waste of the heat, and improving the resource utilization rate of the MSES electric heating system.

Preferably, the step of if the power supply condition is not in the peak period, feeding the heat of the actual heating difference to an energy storage battery through the heat conversion device for electricity storage and next electric heating specifically includes:

acquiring an energy loss rate of the heat conversion device, and calculating actual stored electricity according to the heat of the actual heating difference and the energy loss rate of the heat conversion device;

calculating electric heating energy based on the MS component and the total MS amount of the MSES;

determining whether the actual stored electricity is not less than the electric heating energy, and if the actual stored electricity is not less than the electric heating energy, starting the energy storage battery in an electric heating stage for the electric heating;

if the actual stored electricity is less than the electric heating energy, determining whether the power supply condition is in an off-peak period, and if the power supply condition is in the off-peak period, starting the energy storage battery and the power grid jointly for the electric heating;

if the power supply condition is not in the off-peak period, acquiring a required working temperature, calculating a working temperature in electric heating with the actual stored electricity, setting a temperature difference threshold, and determining whether a difference between the working temperature in the heating with the actual stored electricity and the required working temperature reaches the temperature difference threshold;

if the difference between the working temperature in the heating with the actual stored electricity and the required working temperature does not reach the temperature difference threshold, starting the energy storage battery for the electric heating; and if the difference between the working temperature in the heating with the actual stored electricity and the required working temperature reaches the temperature difference threshold, starting the energy storage battery and a standby battery jointly for the electric heating.

With the above technical solution, in the electric heating stage of the MSES, according to the electricity demand and the stored electricity of the energy storage battery, the present disclosure provides a more reasonable electric heating manner in combination with the power grid and the standby battery, reducing influences on the user, and improving the convenience of the MSES electric heating system.

In conclusion, the present disclosure has at least one the following beneficial technical effects:

1. In response to different use scenarios, the present disclosure analyzes the effects, costs and environmental protection conditions of different MS components according to the actual geographical environment, and provides more suitable MS components according to the actual heating demand, improving the efficiency of the MSES electric heating system.
2. The present disclosure calculates the heat storage capacity of the MS component at the primary proportion according to the actual pressure, pH value, water consumption and chemical reaction condition of the MSES system, and makes the calculated heat storage capacity more accurate according to the actual use, improving the accuracy of the MSES electric heating system.
3. The present disclosure comprehensively analyzes reaction conditions of the different chemically reactive combinations according to reaction intensities of the different chemically reactive combinations of the MS components and according to the reaction range of the reaction amount, and adds reaction conditions of all chemically reactive combinations to obtain the total chemical reaction condition, improving the reliability of the MSES electric heating system.

Figure 1:
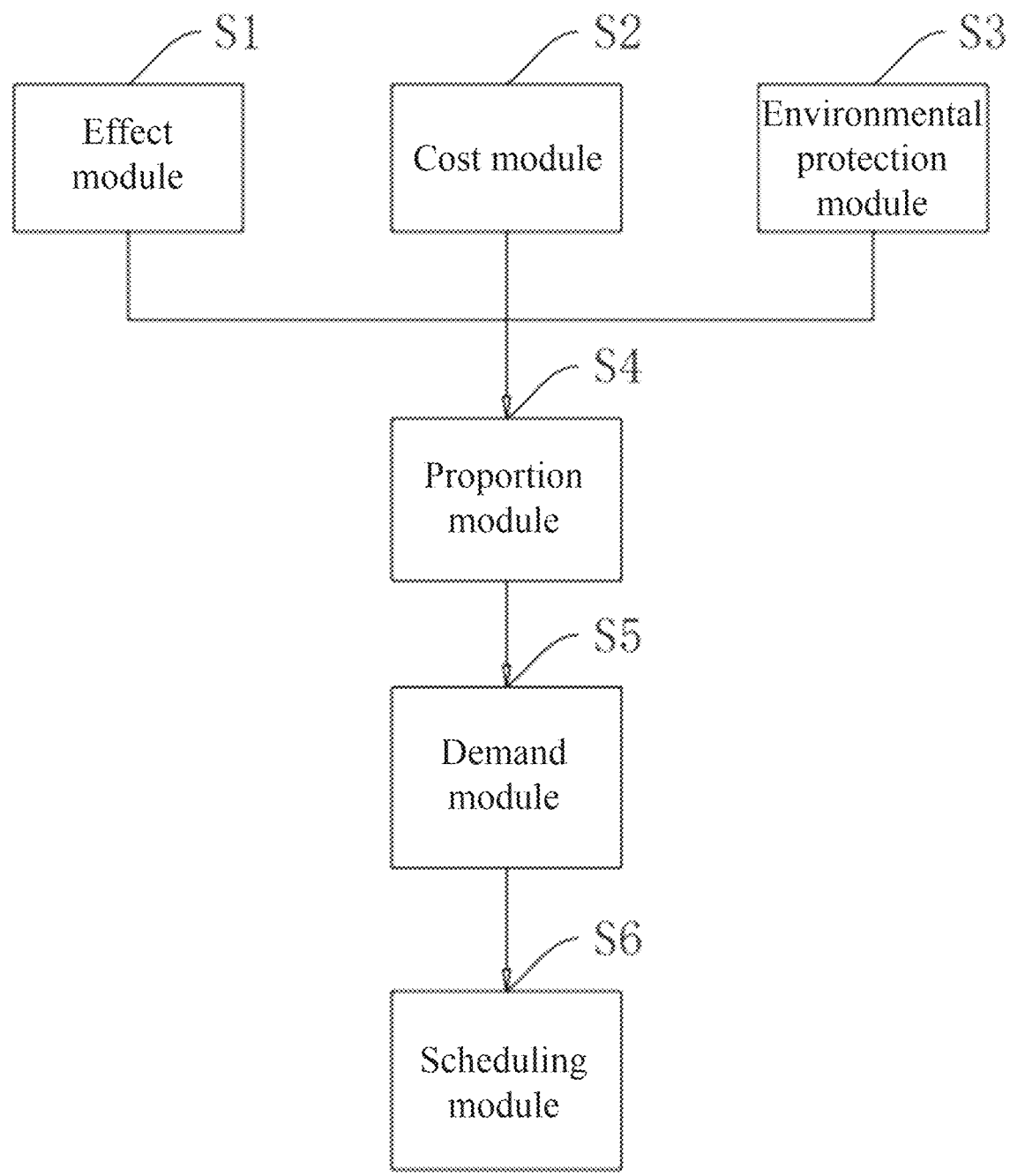
FIG. 1 is a schematic view illustrating connection of specific modules of an MSES electric heating system according to an embodiment of the present disclosure.

Reference numerals: 1: effect module, 2: cost module, 3: environmental protection module, 4: proportion module, 5: demand module, and 6: scheduling module.

DETAILED DESCRIPTION OF THE EMBODIMENTS

The present disclosure is further described below in detail with reference to embodiments and FIGS. 1-9, but the implementations of the present disclosure are not limited thereto.

Embodiment

The present disclosure provides an MSES electric heating system. Referring to FIG. 1, the MSES electric heating system specifically includes: an effect module, a cost module, an environmental protection module, a proportion module, a demand module, and a scheduling module.

The effect module is configured to acquire a geographical environment of MSES, analyze a heat storage effect of each of different MS components according to the geographical environment of the MSES, and label the heat storage effect as a component effect $AX_m$, m being a serial number of each of the different MS components.

The cost module is configured to analyze a cost consumption of each of the different MS components according to the geographical environment of the MSES, and label the cost consumption as $AC_m$, m being the serial number of each of the different MS components.

The environmental protection module is configured to analyze an environmental protection condition of each of the MS components according to the geographical environment of the MSES, and label the environmental protection condition as $AH_m$, m being the serial number of each of the different MS components.

It is to be noted that the environmental protection condition depends on historical pollution of the MS component on the environment in use.

The proportion module in signal connection with the effect module, the cost module and the environmental protection module is configured to receive the component effect $AX_m$, the cost consumption $AC_m$ and the environmental protection condition $AH_m$, calculate suitability of each of the different MS components, determines a proportion of each of the different MS components according to the suitability of each of the different MS components, and label the proportion as an MS component proportion.

The demand module in signal connection with the proportion module is configured to receive the MS component proportion, acquire an actual heating demand, and calculate an actual demand condition.

The scheduling module in signal connection with the demand module is configured to receive the demand condition, and schedule stored heat according to the demand condition.

In actual use, applying same MS components to different scenarios cannot maximize an effect of the MSES. According to geographical environments in different scenarios, the present disclosure analyzes effects, costs and environmental protection conditions of different MS components as well as a user demand, and comprehensively sets the MS component proportion for the MSES. This can further enhance the effect of the MSES, and improve the efficiency of the MSES. For example, the nitrate in the MS components exhibits unique semi-volatility, and its thermodynamic equilibrium is extremely unstable and is greatly affected by the temperature and humidity. During nighttime, the higher relative humidity and lower temperature may lead to an elevated $NO_3^-$ concentration compared to daytime, which directly affects energy storage and release of the MSES system. Hence, the nitrate cannot be used excessively in the high-humidity and low-temperature scenarios.

Figure 2:
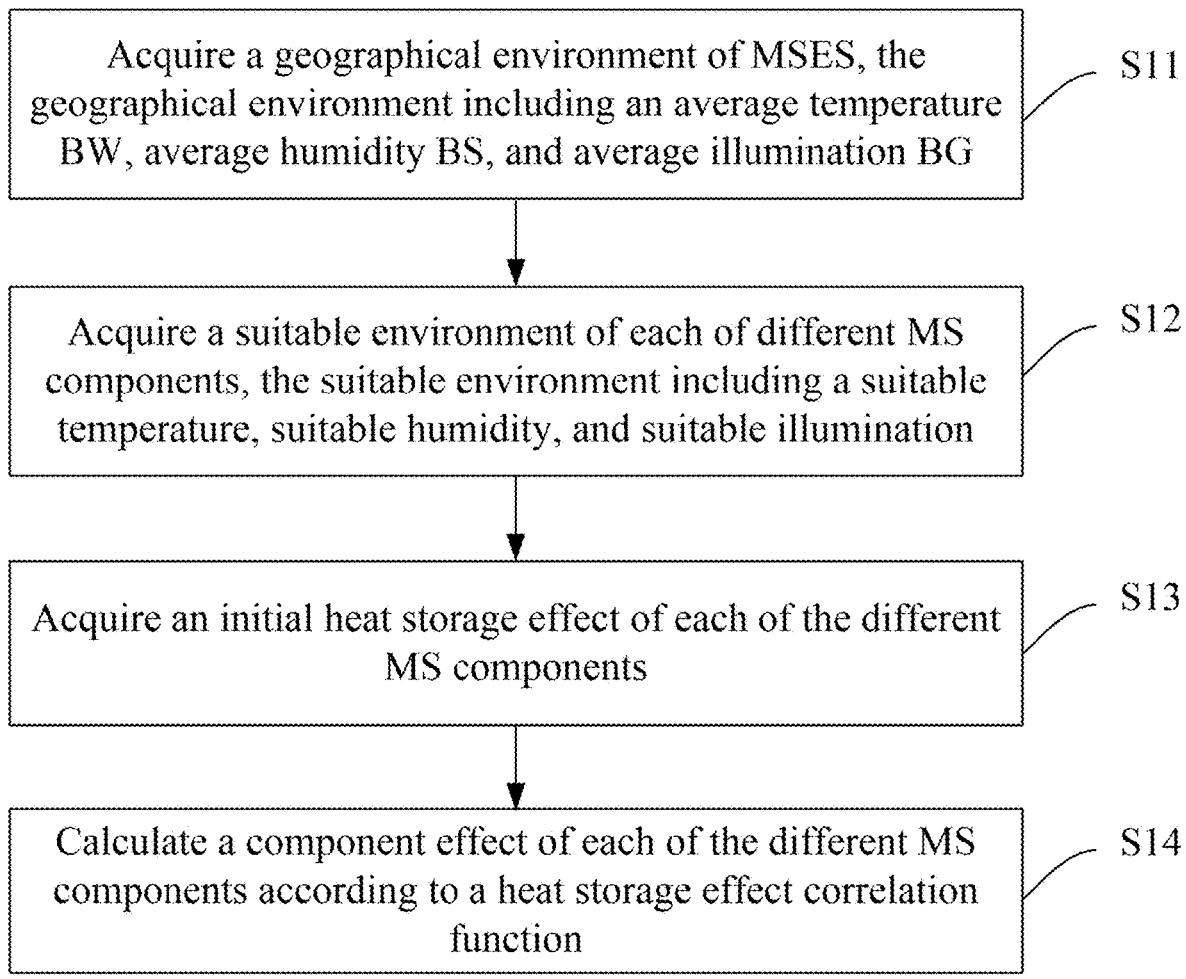
FIG. 2 is a schematic view illustrating specific steps of an effect module of an MSES electric heating system according to an embodiment of the present disclosure.

Referring to FIG. 2, the effect module is configured to acquire the geographical environment of the MSES, analyze the heat storage effect of each of different MS components according to the geographical environment of the MSES, and label the heat storage effect as the component effect $AX_m$, m being the serial number of each of the different MS components, and is specifically configured to:

Step S11: Acquire the geographical environment of the MSES, the geographical environment including an average temperature BW, an average humidity BS, and an average illumination BG.

The average temperature, average humidity and average illumination are acquired through historical weather information.

Step S12: Acquire a suitable environment of each of the different MS components, the suitable environment including a suitable temperature $W_m$, a suitable humidity $S_m$, and a suitable illumination $G_m$, and m being the serial number of each of the different MS components.

The suitable environments of the different MS components are acquired by searching characteristics of the MS components.

Step S13: Acquire an initial heat storage effect $C_m$ of each of the different MS components, m being the serial number of each of the different MS components.

The initial heat storage effects of the different MS components are acquired through a historical use record.

Step S14: Calculate the component effect $AX_m$ of each of the different MS components according to a heat storage effect correlation function $AX_m = C_m - b_1 \times |BW - W_m| - b_2 \times |BS - S_m| - b_3 \times |BG - G_m|$, m being the serial number of each of the different MS components, and $b_1$, $b_2$, and $b_3$ each being a scaling factor greater than 0.

In actual use, there are many MS components in the MSES, such as halides, nitrates and sulfates of alkali metals and alkaline earth metals. Different MS components have different suitable service environments. Hence, in different geographical environments, different MS components are also affected to different extents, exhibiting different heat storage effects. For example, the MSES system stores and releases energy depending on melting and freezing of the MS. The temperature condition in the geographical environment has a direct impact on the state and energy storage efficiency of the MS. Hence, in cold regions, the MS component with a higher melting point is molten more difficultly to affect heat storage of the MS, causing excessively low efficiency of the MSES system.

Figure 3:
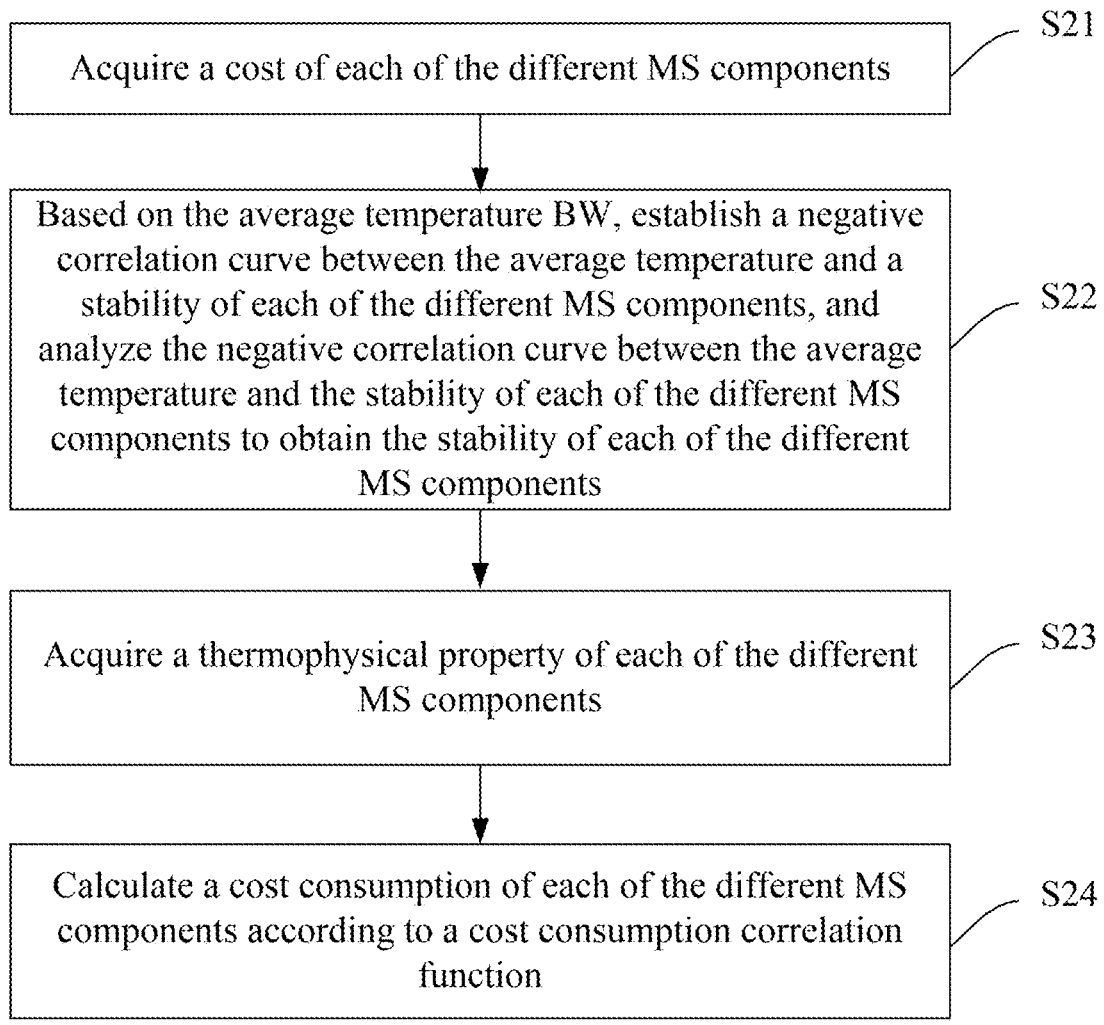
FIG. 3 is a schematic view illustrating specific steps of a cost module of an MSES electric heating system according to an embodiment of the present disclosure.

Referring to FIG. 3, the cost module is configured to analyze the cost consumption of each of the different MS components according to the geographical environment of the MSES, and label the cost consumption as $AC_m$, m being the serial number of each of the different MS components, and is specifically configured to:

Step S21: Acquire a cost $CC_m$ of each of the different MS components, m being the serial number of each of the different MS components.

The costs of the different MS components are acquired through a historical use record.

Step S22: Based on the average temperature BW, establish a negative correlation curve between the average temperature and a stability of each of the different MS components, and analyze the negative correlation curve between the average temperature and the stability of each of the different MS components to obtain the stability $CW_m$ of each of the different MS components, m being the serial number of each of the different MS components.

Step S23: Acquire a thermophysical property $CR_m$ of each of the different MS components, m being the serial number of each of the different MS components.

The thermophysical properties of the different MS components are acquired by searching characteristics of the MS components.

Step S24: Calculate the cost consumption $AC_m$ of each of the different MS components according to a cost consumption correlation function $AC_m = CC_m - c_1 \times CW_m \times c_2 \times CR_m$, m being the serial number of each of the different MS components, and $c_1$ and $c_2$ each being a scaling factor greater than 0.

In actual use, when the MSES electric heating system is used, the MSES electric heating system is constructed first. Hence, the cost for the MSES needs to be considered. Different MS components have different heat storage effects, and consume different costs. Thermophysical parameters of the MS, such as the melting point, specific heat capacity and heat conductivity, have a direct impact on operating efficiency of the MSES system. For example, the high melting point may cause the system to maintain a liquid state of the MS with more energy. The low specific heat capacity means that less heat is stored per unit mass of the MS. This may cause the MSES system to require more MS materials, thereby increasing the cost and the floor space. Besides, the MS components also have distinct prices. Due to instability of the MS components, the material has a certain loss, increasing the cost consumption in use of the MSES.

Figure 4:
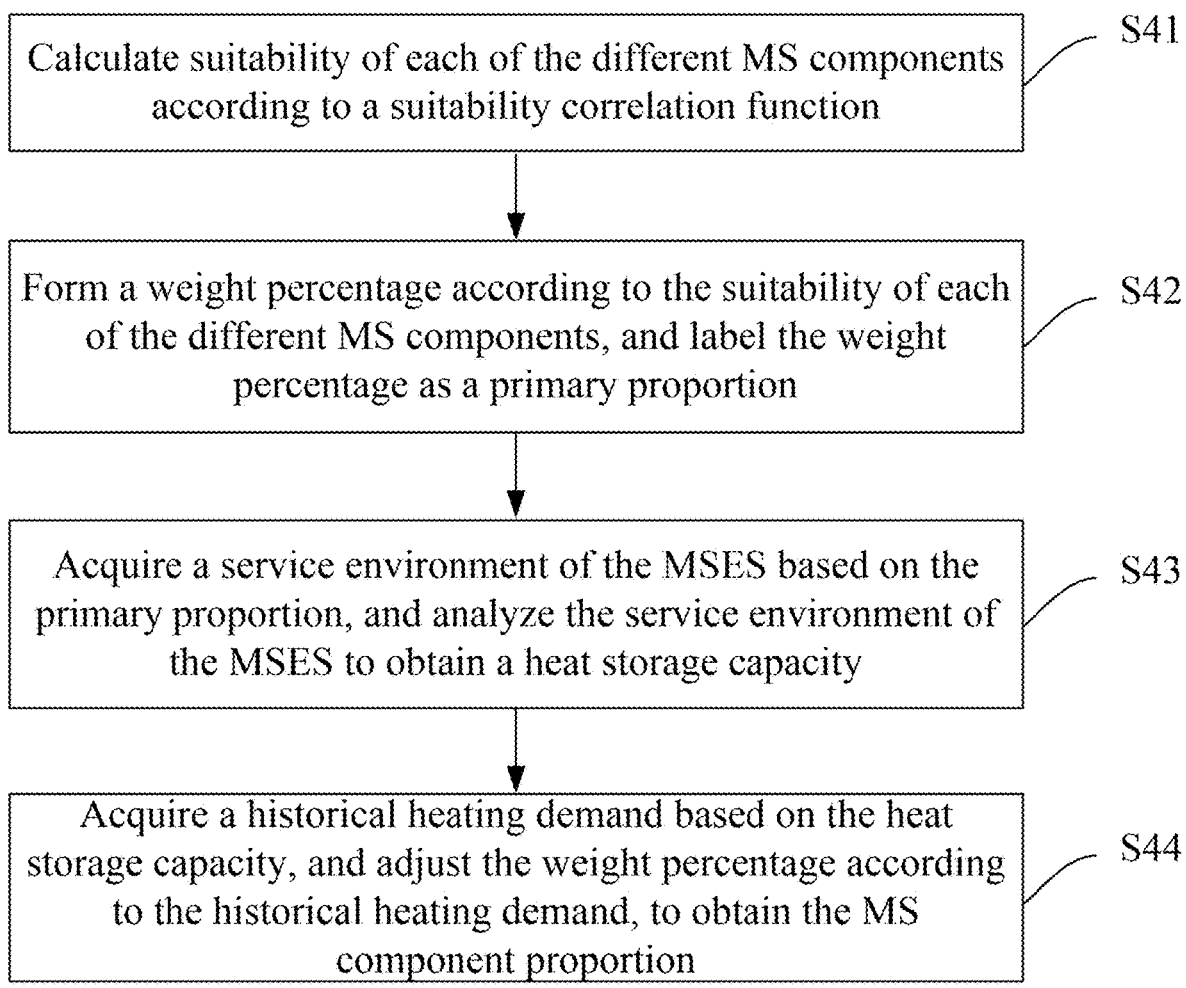
FIG. 4 is a schematic view illustrating specific steps of a proportion module of an MSES electric heating system according to an embodiment of the present disclosure.

Referring to FIG. 4, the proportion module is configured to calculate the suitability of each of the different MS components, determine the proportion of each of the different MS components according to the suitability of each of the different MS components, and label the proportion as the MS component proportion, and is specifically configured to:

Step S41: Calculate the suitability $AS_m$ of each of the different MS components according to a suitability correlation function $AS_m = d_1 \times AX_m - d_2 \times AC_m + d_3 \times AH_m$, m being the serial number of each of the different MS components, and $d_1$, $d_2$, and $d_3$ each being a scaling factor greater than 0.

Step S42: Form a weight percentage according to the suitability $AS_m$ of each of the different MS components, and label the weight percentage as a primary proportion.

Step S43: Acquire a service environment of the MSES based on the primary proportion, and analyze the service environment of the MSES to obtain a heat storage capacity.

Step S44: Acquire a historical heating demand based on the heat storage capacity, and adjust the weight percentage according to the historical heating demand, to obtain the MS component proportion.

In actual use, different MS components have different advantages. Some MS component has a low cost, some MS component has a good component effect, and some MS component is more environment-friendly. Hence, through comprehensive consideration, the suitable MS component is searched for configuration. For the MS component configured according to the suitability, the heat storage capacity needs to be calculated to verify whether it can meet the heating demand of the region, thereby determining the final MS component proportion. For example, the MS component proportion configured according to the suitability includes 50% of sulfate, 30% of nitrate, and 20% of alkali metal. However, the heat storage capacity does not meet the heating demand in fact. Although the proportion is the most suitable MS component proportion, it cannot meet the heating demand and the actual application effect of the MSES system is poor. In this case, the MS component proportion is adjusted with the sacrifice of the cost and environmental protection condition, thereby improving the efficiency of the MSES.

Figure 5:
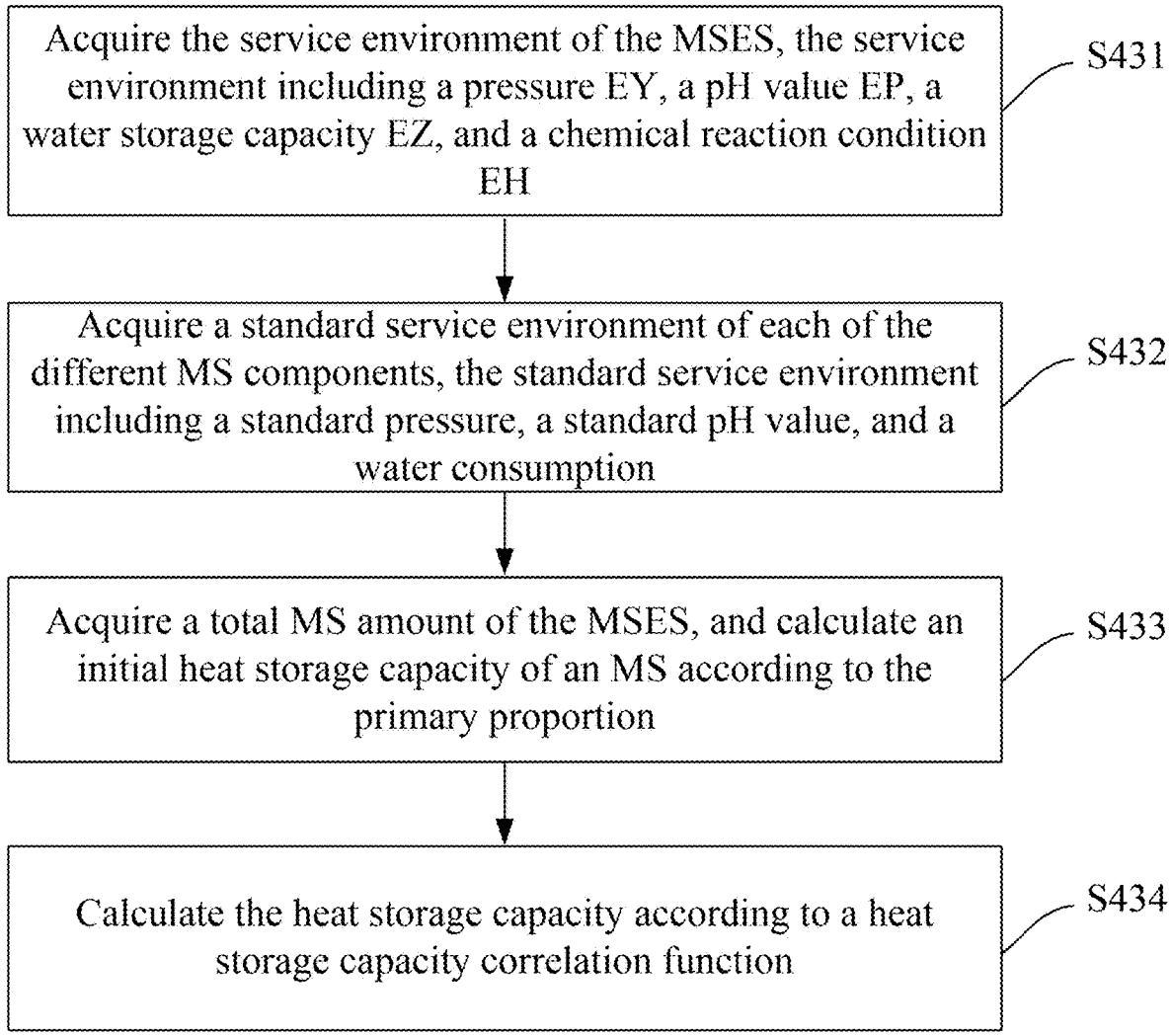
FIG. 5 is a schematic view illustrating specific steps of a step S43 of an MSES electric heating system according to an embodiment of the present disclosure.

Referring to FIG. 5, the step that a service environment of the MSES is acquired based on the primary proportion, and the service environment of the MSES is analyzed to obtain a heat storage capacity specifically includes:

Step S431: Acquire the service environment of the MSES, the service environment including a pressure EY, a pH value EP, a water storage capacity EZ, and a chemical reaction condition EH.

The service environment is obtained through an operating record.

Step S432: Acquire a standard service environment of the MS component, the standard service environment including a standard pressure $Y_m$, a standard pH value $P_m$, and water consumption $Z_m$.

The standard service environment is acquired by searching characteristics of the MS components.

Step S433: Acquire a total MS amount of the MSES, and calculate an initial heat storage capacity $E_0$ of an MS according to the primary proportion.

The total MS amount of the MSES depends on an MS amount set by the user.

Step S434: Calculate the heat storage capacity EC according to a heat storage capacity correlation function $EC=E_0-e_1\times|EY-Y_m|-e_2\times|EP-P_m|-e_3-|EZ-Z_m|-EH$, $e_1$, $e_2$, and $e_3$ each being a scaling factor greater than 0.

In actual use, the change of the pressure may have an impact on physicochemical properties of the MS, such as the density, viscosity and electrical conductivity, thus affecting the heat storage efficiency of the MSES. The pH value of the solution also has an impact on the solubility of the salt. For example, the nitrate is more stable in an acid environment, while the sulfate is more prone to chemical reaction in an alkaline environment. Likewise, the MS component is also affected by illumination. Some nitrate and halide are decomposed under the illumination to compromise the chemical stability. Certainly, the MS components also chemically react to each other to change the solubility and reactivity of the salts, finally affecting the heat storage capacity.

Figure 6:
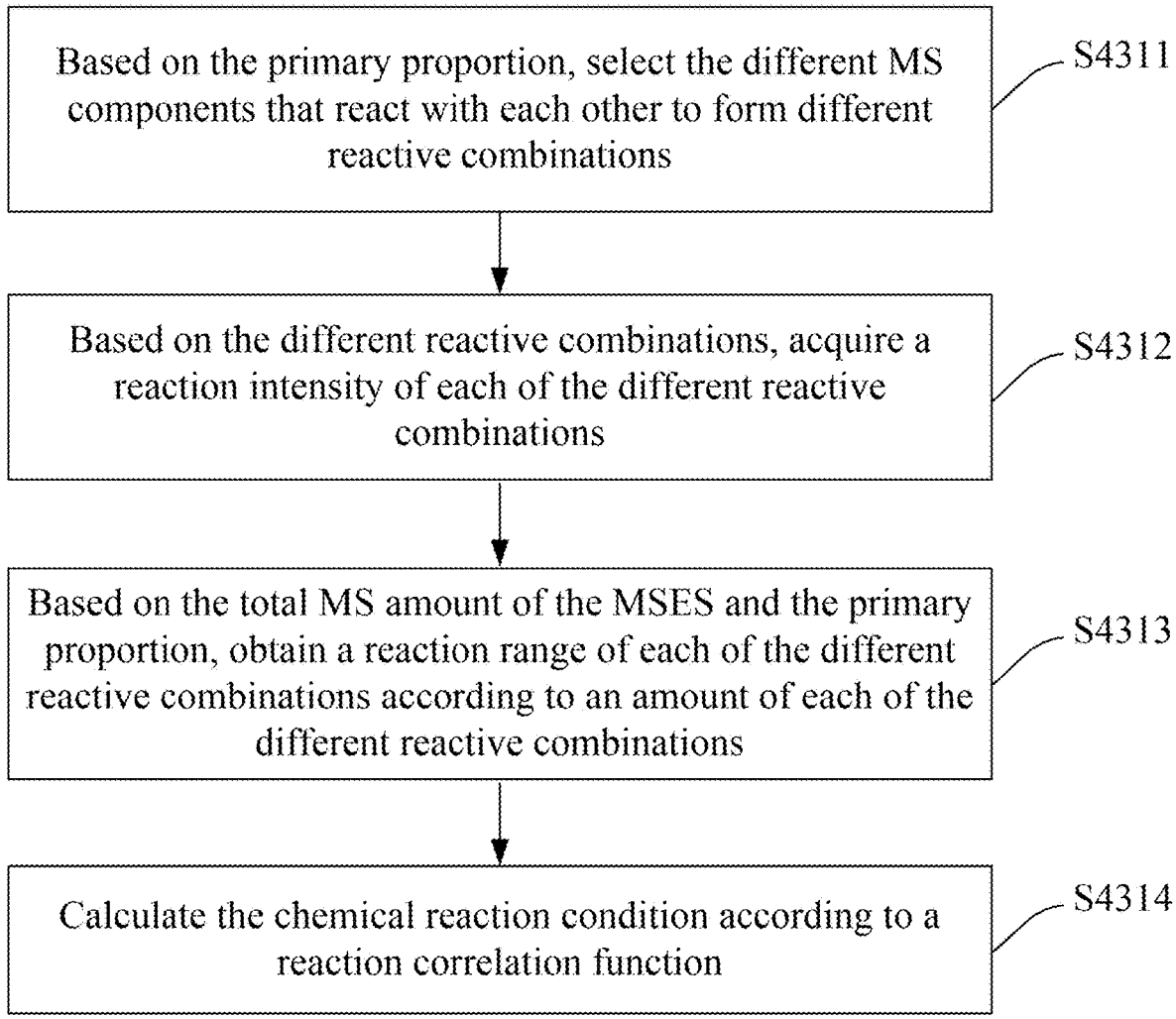
FIG. 6 is a schematic view illustrating specific steps of a step S431 of an MSES electric heating system according to an embodiment of the present disclosure.

Referring to FIG. 6, the step that the chemical reaction condition EH is acquired specifically includes:

Step S4311: Based on the primary proportion, select the different MS components that react with each other to form different reactive combinations.

Step S4312: Based on the different reactive combinations, acquire a reaction intensity $Z_n$ of each of the different reactive combinations, n being a serial number of each of the different reactive combinations.

It is to be noted that reaction intensities of different reactive combinations are obtained according to existing experimental data.

Step S4313: Based on the total MS amount of the MSES and the primary proportion, obtain a reaction range $F_n$ of each of the different reactive combinations according to an amount of each of the different reactive combinations, n being the serial number of each of the different reactive combinations.

Step S4314: Calculate the chemical reaction condition EH according to a reaction correlation function $$EH = \sum_{i=0}^{n} Z_i \times F_i,$$

n being the serial number of each of the different reactive combinations.

In actual use, there are many MS components, but not all of the MS components chemically react with each other. First of all, the MS components that react with each other are selected to form reactive combinations. Then, according to a reaction intensity and a reaction range of each of the different reactive combinations, a reaction condition of the reactive combination is obtained. At last, reaction conditions of all reactive combinations are added to obtain a total chemical reaction condition. The intense chemical reaction condition will affect the MSES, and consume the material, thus affecting the heat storage capacity of the MSES. For example, the nitrate reacts with alkali metal at the high temperature to generate nitrogen oxide gas and other products. The sodium nitrate can be decomposed into sodium oxide and oxygen, while releasing nitrogen oxide gas.

Figure 7:
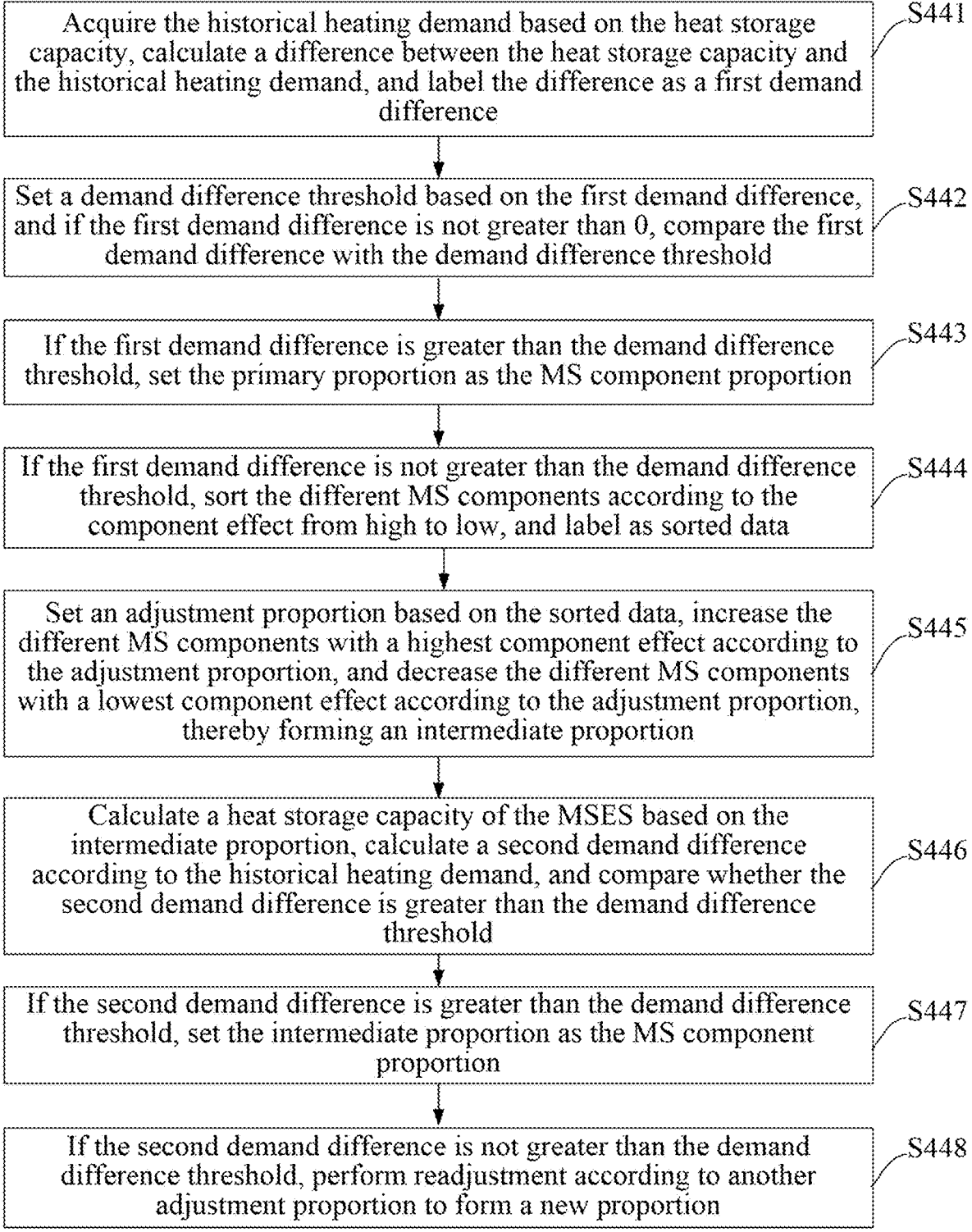
FIG. 7 is a schematic view illustrating specific steps of a step S44 of an MSES electric heating system according to an embodiment of the present disclosure.

Referring to FIG. 7, the step that a historical heating demand is acquired based on the heat storage capacity, and the weight percentage is adjusted according to the historical heating demand, to obtain the MS component proportion specifically includes:

Step S441: Acquire the historical heating demand based on the heat storage capacity, calculate a difference between the heat storage capacity and the historical heating demand, and label the difference as a first demand difference.

Step S442: Set a demand difference threshold based on the first demand difference, and if the first demand difference is not greater than 0, compare the first demand difference with the demand difference threshold.

Step S443: If the first demand difference is greater than the demand difference threshold, set the primary proportion as the MS component proportion.

Step S444: If the first demand difference is not greater than the demand difference threshold, sort the different MS components according to the component effect $AX_m$ from high to low, and label as sorted data.

Step S445: Set an adjustment proportion based on the sorted data, increase the different MS components with a highest component effect according to the adjustment proportion, and decrease the different MS components with a lowest component effect according to the adjustment proportion, thereby forming an intermediate proportion.

Step S446: Calculate a heat storage capacity of the MSES based on the intermediate proportion, calculate a second demand difference according to the historical heating demand, and compare whether the second demand difference is greater than the demand difference threshold.

Step S447: If the second demand difference is greater than the demand difference threshold, set the intermediate proportion as the MS component proportion.

Step S448: If the second demand difference is not greater than the demand difference threshold, perform readjustment according to another adjustment proportion to form a new proportion.

In actual use, in order to obtain a more accurate MS component proportion, and realize more economical, more environment-friendly and more effective MSES, the MS component is adjusted repeatedly. For example, the primary proportion is an optimal proportion obtained according to the effect, cost and environmental protection. If the heating supply meets the demand, the primary proportion is directly used to configure the MS component. If the primary proportion does not meet the demand, the proportion of the MS component with the better heat storage effect is increased, while the proportion of the MS component with the poorer heat storage effect is decreased. The adjustment proportion can be adjusted repeatedly, reducing an error. If the adjusted MS component proportion still does not meet the heating demand, the proportion is readjusted, until it meets the heating demand.

Figure 8:
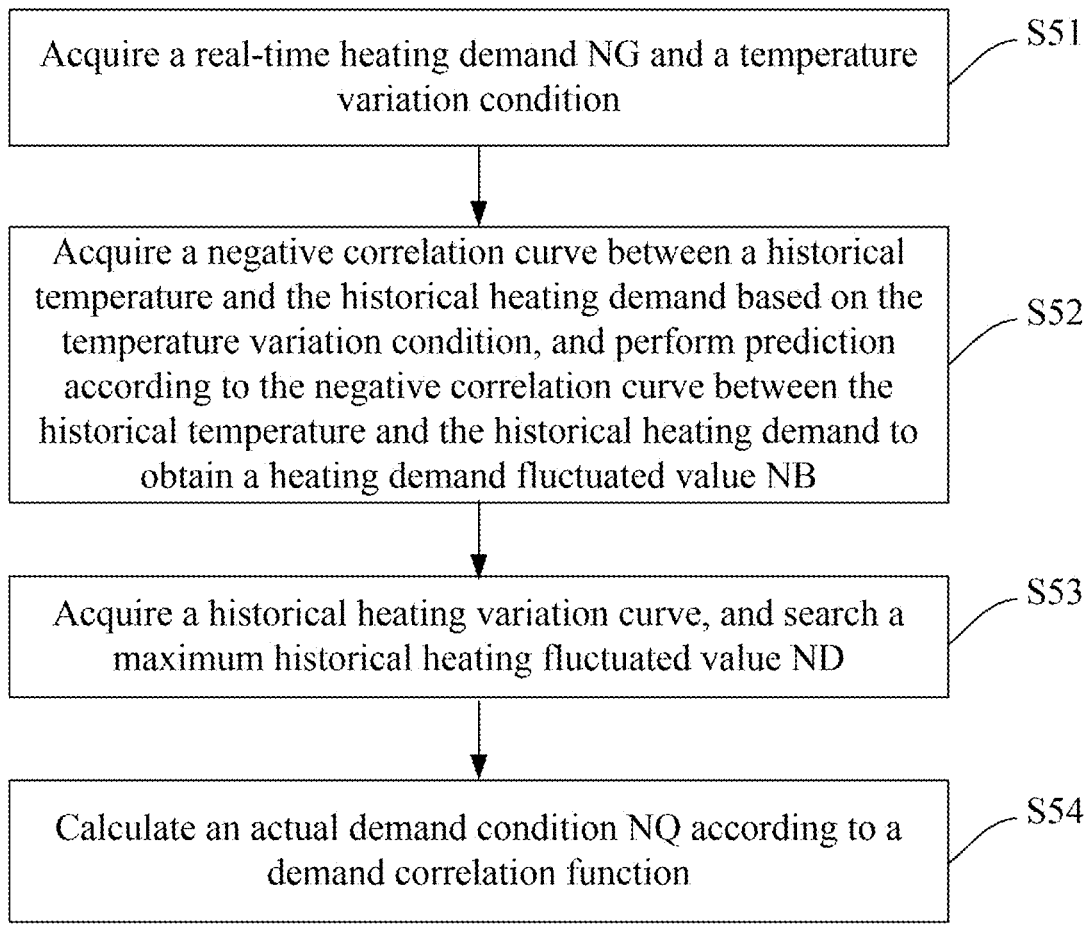
FIG. 8 is a schematic view illustrating specific steps of a demand module of an MSES electric heating system according to an embodiment of the present disclosure.

Referring to FIG. 8, the step that an actual heating demand is acquired, and an actual demand condition is calculated specifically includes:

Step S51: Acquire a real-time heating demand NG and a temperature variation condition.

Step S52: Acquire a negative correlation curve between a historical temperature and the historical heating demand based on the temperature variation condition, and perform prediction according to the negative correlation curve between the historical temperature and the historical heating demand to obtain a heating demand fluctuated value NB.

Step S53: Acquire a historical heating variation curve, and search a maximum historical heating fluctuated value ND.

Step S54: Calculate the actual demand condition NQ according to a demand correlation function NQ=NG+ND+NQ.

In actual use, the MSES system is constructed according to a historical use condition. The heating demand is changing with the weather in the actual use. The MSES system stores energy after electrically heated. Hence, the heating demand is calculated necessarily according to an actual condition, so as not to store excessive heat to cause a waste of electricity. The heating supply is decreased in response to an increased temperature, and increased in response to a decreased temperature. For example, in response to the real-time heating demand of 1,000,000 KWH, it is predicted that the present temperature will be decreased, and the heating demand will be increased by 200,000 KWH. In order not to affect the use experience, more heating supply needs to be prepared to cope with a sudden change of the temperature. Through searching a historical heating record, the maximum fluctuated value of the heating demand is 100,000 KWH, and thus the heating supply of 1,300,000 KWH needs to be stored actually by electric heating.

Figure 9:
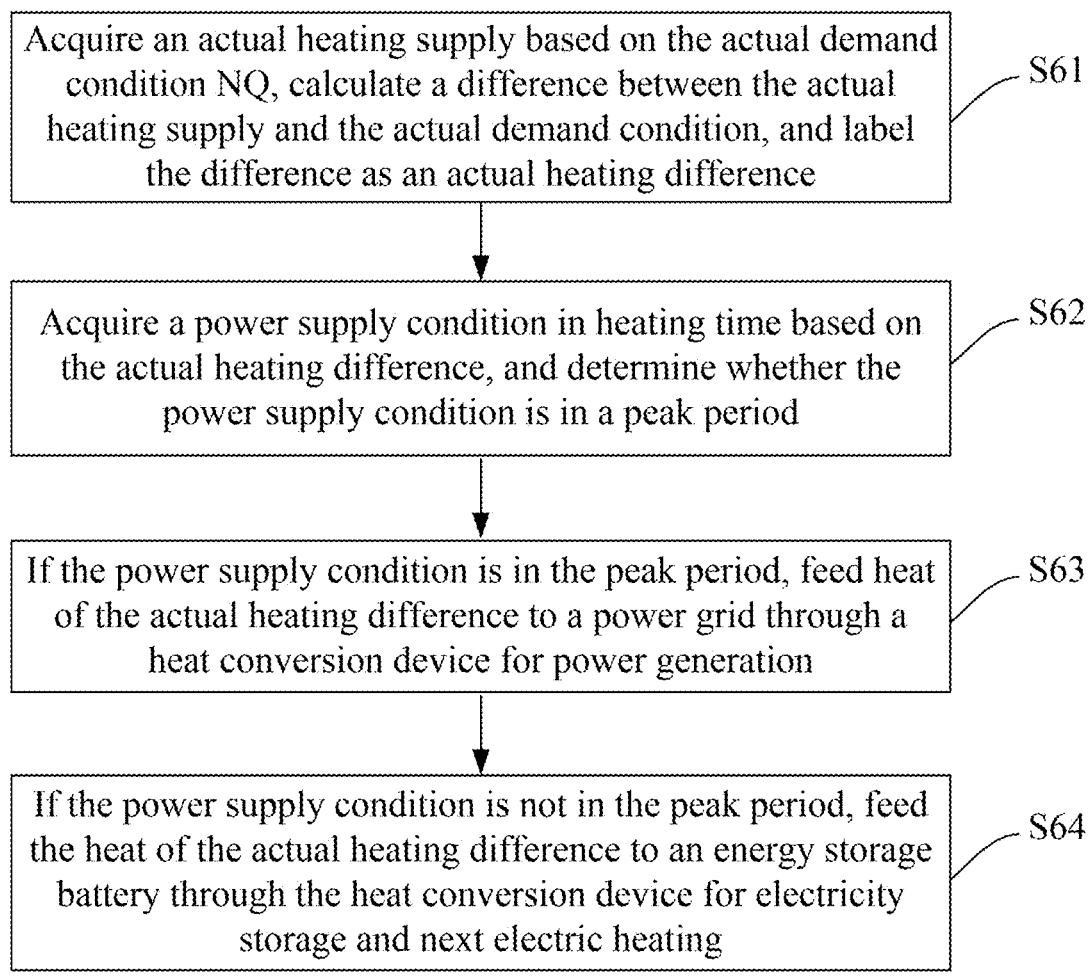
FIG. 9 is a schematic view illustrating specific steps of a scheduling module of an MSES electric heating system according to an embodiment of the present disclosure.

Referring to FIG. 9, the scheduling module in signal connection with the demand module is configured to receive the demand condition, and schedule the stored heat according to the demand condition, and is specifically configured to:

Step S61: Acquire an actual heating supply based on the actual demand condition NQ, calculate a difference between the actual heating supply and the actual demand condition, and label the difference as an actual heating difference.

Step S62: Acquire a power supply condition in heating time based on the actual heating difference, and determine whether the power supply condition is in a peak period.

Step S63: If the power supply condition is in the peak period, feed heat of the actual heating difference to a power grid through a heat conversion device for power generation.

Step S64: If the power supply condition is not in the peak period, feed the heat of the actual heating difference to an energy storage battery through the heat conversion device for electricity storage and next electric heating.

In actual use, in order not to affect the use experience, a heating supply greater than the demand of the user is prepared. In actual heating, it is frequent that excess heat is wasted. In order to reduce the waste of heat, the excess heat can be used for power generation. For example, in the peak period, the excess heat is used for power generation of the power grid, and is used directly for residential electricity consumption. This can alleviate the burden of the power grid. In the off-peak period, when the burden of the power grid is not heavy, the heat can be converted into the electricity to store in the energy storage battery for the next electric heating, saving the resource.

Figure 10:
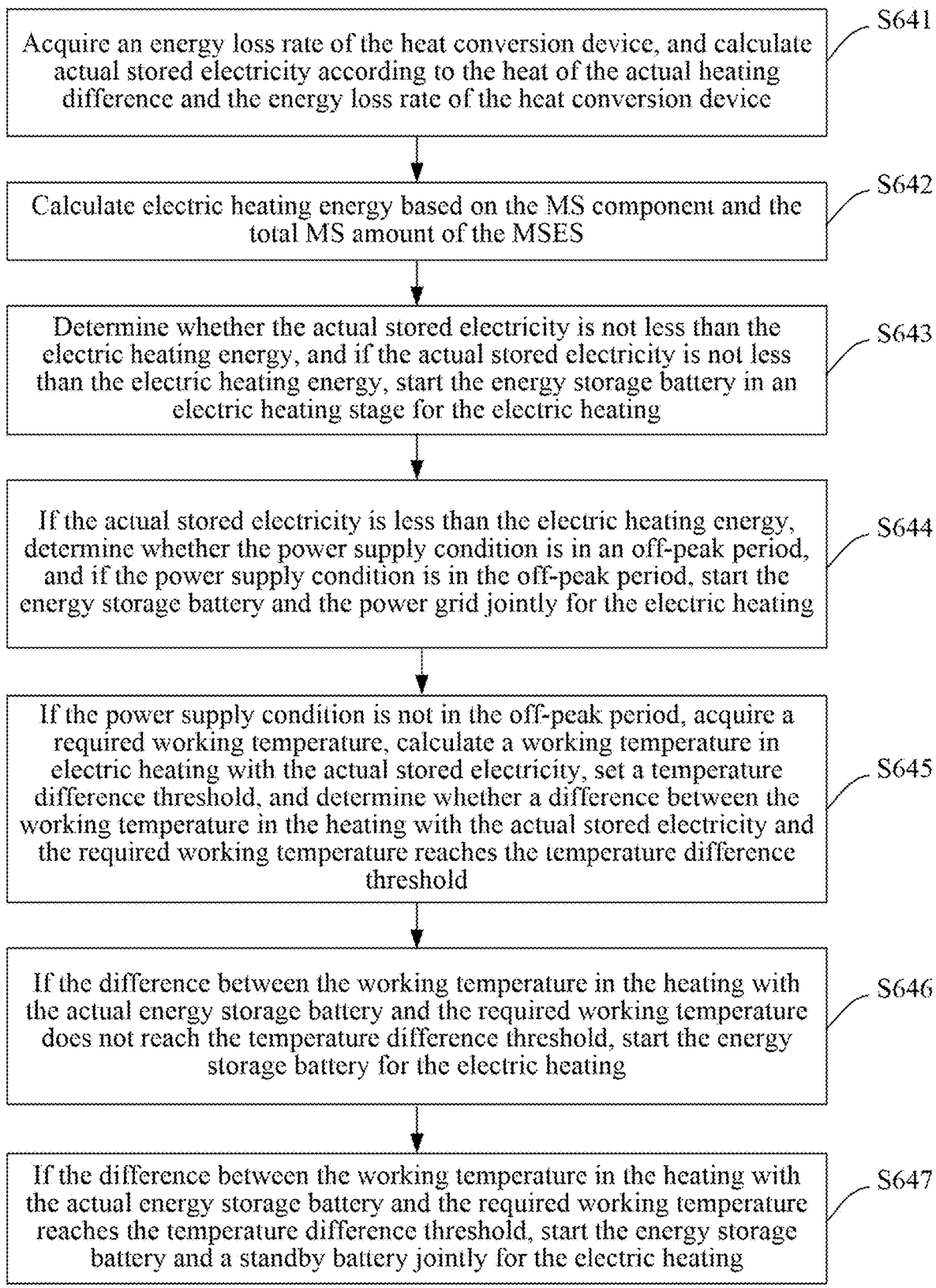
FIG. 10 is a schematic view illustrating specific steps of a step S64 of an MSES electric heating system according to an embodiment of the present disclosure.

Referring to FIG. 10, the step that if the power supply condition is not in the peak period, the heat of the actual heating difference is fed to an energy storage battery through the heat conversion device for electricity storage and next electric heating specifically includes:

Step S641: Acquire an energy loss rate of the heat conversion device, and calculate actual stored electricity according to the heat of the actual heating difference and the energy loss rate of the heat conversion device.

The energy loss rate of the heat conversion device is obtained from factory information of the heat conversion device.

Step S642: Calculate electric heating energy based on the MS component and the total MS amount of the MSES.

An actual heating supply is predicted according to a temperature variation. Electricity required for heating to the temperature of the heating supply is calculated according to the actual heating supply and the total MS amount. The electricity is labeled as the electric heating energy.

Step S643: Determine whether the actual stored electricity is not less than the electric heating energy, and if the actual stored electricity is not less than the electric heating energy, start the energy storage battery in an electric heating stage for the electric heating.

Step S644: If the actual stored electricity is less than the electric heating energy, determine whether the power supply condition is in an off-peak period, and if the power supply condition is in the off-peak period, start the energy storage battery and the power grid jointly for the electric heating.

Step S645: If the power supply condition is not in the off-peak period, acquire a required working temperature, calculate a working temperature in electric heating with the actual stored electricity, set a temperature difference threshold is set, and determine whether a difference between the working temperature in the heating with the actual stored electricity and the required working temperature reaches the temperature difference threshold.

Step S646: If the difference between the working temperature in the heating with the actual stored electricity and the required working temperature does not reach the temperature difference threshold, start the energy storage battery for the electric heating.

Step S647: If the difference between the working temperature in the heating with the actual stored electricity and the required working temperature reaches the temperature difference threshold, start the energy storage battery and a standby battery jointly for the electric heating.

In actual use, there is a certain energy loss when the heat is converted into the electricity. Actual electricity is calculated according to the heat conversion device. When the electricity of the energy storage battery is insufficient to realize electric heating of the MSES system, if the power grid is in the off-peak period, the power grid can be used for the electric heating while the residential electricity consumption is not affected. If the power grid is not in the off-peak period, when the power grid is used for heating the MSES system, there is a risk of affecting the residential electricity consumption. In this case, the heating can be realized by lowering the temperature. For example, when the heating demand is up to 60° C., in case of an electricity shortage, the system can be heated to 55° C. to supply heat. If the electricity still cannot meet the demand, the standby battery is started.

The system has the following implementation principle: The effect module is configured to acquire a geographical environment of MSES, analyze a heat storage effect of each of different MS components according to a humidity, a temperature and an illumination, and label the heat storage effect as a component effect. According to a cost of the MS component, as well as a consumption of the MS component caused by a stability and a thermophysical property of the MS component, the cost module is configured to analyze a cost consumption of each of the different MS components, and label the cost consumption. The environmental protection module is configured to analyze an environmental protection condition of each of the different MS components according to the geographical environment of the MSES, and label the environmental protection condition. The proportion module is configured to calculate suitability of each of the different MS components according to the component effect, the cost consumption and the environmental protection condition, and determine a primary proportion according to the suitability of each of the different MS component. For the MS component configured based on the primary proportion, a heat storage capacity of the MS component at the proportion is analyzed according to a pressure, a pH value, a water consumption and a chemical reaction condition. If the heat storage capacity does not meet a heating demand, the proportion is adjusted repeatedly, until a proportion meeting the demand is obtained. According to this proportion, the MS component is configured. The demand module is configured to receive the MS component, acquire an actual heating demand, and calculate an actual demand condition according to a temperature variation condition and a maximum fluctuated value of a historical heating demand. The scheduling module is configured to receive the demand condition. Through the heat conversion device, excess heat in different conditions is converted into electricity and fed to the power grid or the energy storage battery. In the electric heating, different electric heating manners are matched according to an actual heating capacity and an electric quantity of the energy storage battery.

The above are preferred embodiments of present disclosure, but the protection scope of present disclosure is not limited thereto. Therefore, all equivalent changes made in accordance with the structure, shape, and principle of present disclosure shall fall within the protection scope of present disclosure.

What is claimed is:

1. A molten salt energy storage (MSES) electric heating method, comprising:
acquiring a geographical environment of MSES, analyzing a heat storage effect of each of a plurality of molten salt (MS) components according to the geographical environment of the MSES, and labeling the heat storage effect as a component effect $AX_m$, wherein m is a serial number of each of the plurality of MS components;
analyzing a cost consumption of each of the plurality of MS components according to the geographical environment of the MSES, and labeling the cost consumption as $AC_m$;
analyzing an environmental protection condition of each of the plurality of MS components according to the geographical environment of the MSES, and labeling the environmental protection condition as $AH_m$;
calculating suitability of each of the plurality of MS components according to the component effect $AX_m$, the cost consumption $AC_m$ and the environmental protection condition $AH_m$, determining a proportion of each of the plurality of MS components according to the suitability of each of the plurality of MS components, and labeling the proportion as an MS component proportion;
acquiring an actual heating demand, and calculating an actual demand condition; and
scheduling stored heat according to the actual demand condition, which specifically comprising:
acquiring an actual heating supply based on the actual demand condition, calculating a difference between the actual heating supply and the actual demand condition, and labeling the difference between the actual heating supply and the actual demand condition as an actual heating difference;
acquiring a power supply condition in heating time based on the actual heating difference, and determining whether the power supply condition is in a peak period;
feeding heat of the actual heating difference to a power grid through a heat conversion device for power generation if the power supply condition is in the peak period; and
feeding the heat of the actual heating difference to an energy storage battery through the heat conversion device for electricity storage and next electric heating if the power supply condition is not in the peak period.

2. The MSES electric heating method according to claim 1, wherein acquiring the geographical environment of the MSES, analyzing the heat storage effect of each of the plurality of MS components according to the geographical environment of the MSES, and labeling the heat storage effect as the component effect $AX_m$ specifically comprises:
acquiring the geographical environment of the MSES, wherein the geographical environment comprises an average temperature BW, an average humidity BS, and an average illumination BG;
acquiring a suitable environment of each of the plurality of MS components, wherein the suitable environment comprises a suitable temperature $W_m$, a suitable humidity $S_m$, and a suitable illumination $G_m$;
acquiring an initial heat storage effect $C_m$ of each of the plurality of MS components; and
calculating the component effect $AX_m$ of each of the plurality of MS components according to a heat storage effect correlation function $AX_m = C_m - b_1 \times |BW - W_m| - b_2 \times |BS - S_m| - b_3 \times |BG - G_m|$, wherein $b_1$, $b_2$, and $b_3$ each are a scaling factor greater than 0.

3. The MSES electric heating method according to claim 2, wherein analyzing the cost consumption of each of the plurality of MS components according to the geographical environment of the MSES, and labeling the cost consumption as $AC_m$ specifically comprises:
acquiring a cost $CC_m$ of each of the plurality of MS components;
based on the average temperature BW, establishing a negative correlation curve between the average temperature and a stability of each of the plurality of MS components, and analyzing the negative correlation curve between the average temperature and the stability of each of the plurality of MS components to obtain the stability $CW_m$ of each of the plurality of MS components;
acquiring a thermophysical property $CR_m$ of each of the plurality of MS components; and
calculating the cost consumption $AC_m$ of each of the plurality of MS components according to a cost consumption correlation function $AC_m = CC_m - c_1 \times CW_m - c_2 \times CR_m$, wherein $c_1$ and $c_2$ each are a scaling factor greater than 0.

4. The MSES electric heating method according to claim 3, wherein calculating the suitability of each of the plurality of MS components according to the component effect $AX_m$, the cost consumption $AC_m$ and the environmental protection condition $AH_m$, determining the proportion of each of the plurality of MS components according to the suitability of each of the plurality of MS components, and labeling the proportion as the MS component proportion specifically comprises:

calculating the suitability $AS_m$ of each of the plurality of MS components according to a suitability correlation function $AS_m = d_1 \times AX_m - d_2 \times AC_m + d_3 \times AH_m$, wherein $d_1$, $d_2$, and $d_3$ each are a scaling factor greater than 0;

forming a weight percentage according to the suitability $AS_m$ of each of the plurality of MS components, and labeling the weight percentage as a primary proportion;

acquiring a service environment of the MSES based on the primary proportion, and analyzing the service environment of the MSES to obtain a heat storage capacity; and acquiring a historical heating demand based on the heat storage capacity, and adjusting the weight percentage according to the historical heating demand, to obtain the MS component proportion.

5. The MSES electric heating method according to claim 4, wherein acquiring the service environment of the MSES based on the primary proportion, and analyzing the service environment of the MSES to obtain the heat storage capacity specifically comprises:

acquiring the service environment of the MSES, wherein the service environment comprises a pressure EY, a pH value EP, a water storage capacity EZ, and a chemical reaction condition EH;

acquiring a standard service environment of each of the plurality of MS components, wherein the standard service environment comprises a standard pressure $Y_m$, a standard pH value $P_m$, and a water consumption $Z_m$;

acquiring a total MS amount of the MSES, and calculating an initial heat storage capacity $E_0$ of an MS according to the primary proportion; and calculating the heat storage capacity EC according to a heat storage capacity correlation function $EC = E_0 - e_1 \times |EY - Y_m| - e_2 \times |EP - P_m| - e_3 \times |EZ - Z_m| - EH$, wherein $e_1$, $e_2$, and $e_3$ each are a scaling factor greater than 0.

6. The MSES electric heating method according to claim 5, wherein acquiring the chemical reaction condition EH specifically comprises:

based on the primary proportion, selecting the plurality of MS components that react with each other to form a plurality of reactive combinations;

based on the plurality of reactive combinations, acquiring a reaction intensity $Z_n$ of each of the plurality of reactive combinations, wherein n is a serial number of each of the plurality of reactive combinations;

based on the total MS amount of the MSES and the primary proportion, obtaining a reaction range $F_n$ of each of the plurality of reactive combinations according to an amount of each of the plurality of reactive combinations; and calculating the chemical reaction condition EH according to a reaction correlation function $$EH = \sum_{i=0}^{n} Z_i \times F_i,$$

wherein n is the serial number of each of the plurality of reactive combinations.

7. The MSES electric heating method according to claim 6, wherein acquiring the historical heating demand based on the heat storage capacity, and adjusting the weight percentage according to the historical heating demand, to obtain the MS component proportion specifically comprises:

acquiring the historical heating demand based on the heat storage capacity, calculating a difference between the heat storage capacity and the historical heating demand, and labeling the difference between the heat storage capacity and the historical heating demand as a first demand difference;

setting a demand difference threshold based on the first demand difference, and if the first demand difference is not greater than 0, comparing the first demand difference with the demand difference threshold;

if the first demand difference is greater than the demand difference threshold, setting the primary proportion as the MS component proportion;

if the first demand difference is not greater than the demand difference threshold, sorting the plurality of MS components according to the component effect $AX_m$ from high to low, and labeling as sorted data;

setting an adjustment proportion based on the sorted data, increasing the plurality of MS components with a highest component effect according to the adjustment proportion, and decreasing the plurality of MS components with a lowest component effect according to the adjustment proportion, thereby forming an intermediate proportion;

calculating the heat storage capacity of the MSES based on the intermediate proportion, calculating a second demand difference according to the historical heating demand, and comparing whether the second demand difference is greater than the demand difference threshold;

if the second demand difference is greater than the demand difference threshold, setting the intermediate proportion as the MS component proportion; and if the second demand difference is not greater than the demand difference threshold, performing readjustment according to another adjustment proportion to form a new proportion.

8. The MSES electric heating method according to claim 7, wherein acquiring the actual heating demand, and calculating the actual demand condition specifically comprises:

acquiring a real-time heating demand NG and a temperature variation condition;

acquiring a negative correlation curve between a historical temperature and the historical heating demand based on the temperature variation condition, and performing prediction according to the negative correlation curve between the historical temperature and the historical heating demand to obtain a heating demand fluctuated value NB;

acquiring a historical heating variation curve, and searching a maximum historical heating fluctuated value ND; and calculating the actual demand condition NQ according to a demand correlation function $NQ = NG + ND + NQ$.

9. The MSES electric heating method according to claim 1, wherein feeding the heat of the actual heating difference to the energy storage battery through the heat conversion device for electricity storage and next electric heating if the power supply condition is not in the peak period, specifically comprises:

acquiring an energy loss rate of the heat conversion device, and calculating actual stored electricity according to the heat of the actual heating difference and the energy loss rate of the heat conversion device;

calculating electric heating energy based on the plurality of MS components and the total MS amount of the MSES;

determining whether the actual stored electricity is not less than the electric heating energy, and if the actual stored electricity is not less than the electric heating energy, starting the energy storage battery in an electric heating stage for electric heating;

if the actual stored electricity is less than the electric heating energy, determining whether the power supply condition is in an off-peak period, and if the power supply condition is in the off-peak period, starting the energy storage battery and the power grid jointly for the electric heating;

if the power supply condition is not in the off-peak period, acquiring a required working temperature, calculating a working temperature in heating with the actual stored electricity, setting a temperature difference threshold, and determining whether a difference between the working temperature in the heating with the actual stored electricity and the required working temperature reaches the temperature difference threshold;

if the difference between the working temperature in the heating with the actual stored electricity and the required working temperature does not reach the temperature difference threshold, starting the energy storage battery for the electric heating; and if the difference between the working temperature in the heating with the actual stored electricity and the required working temperature reaches the temperature difference threshold, starting the energy storage battery and a standby battery jointly for the electric heating.

* * * * *